UNITED STATES PATENT OFFICE.

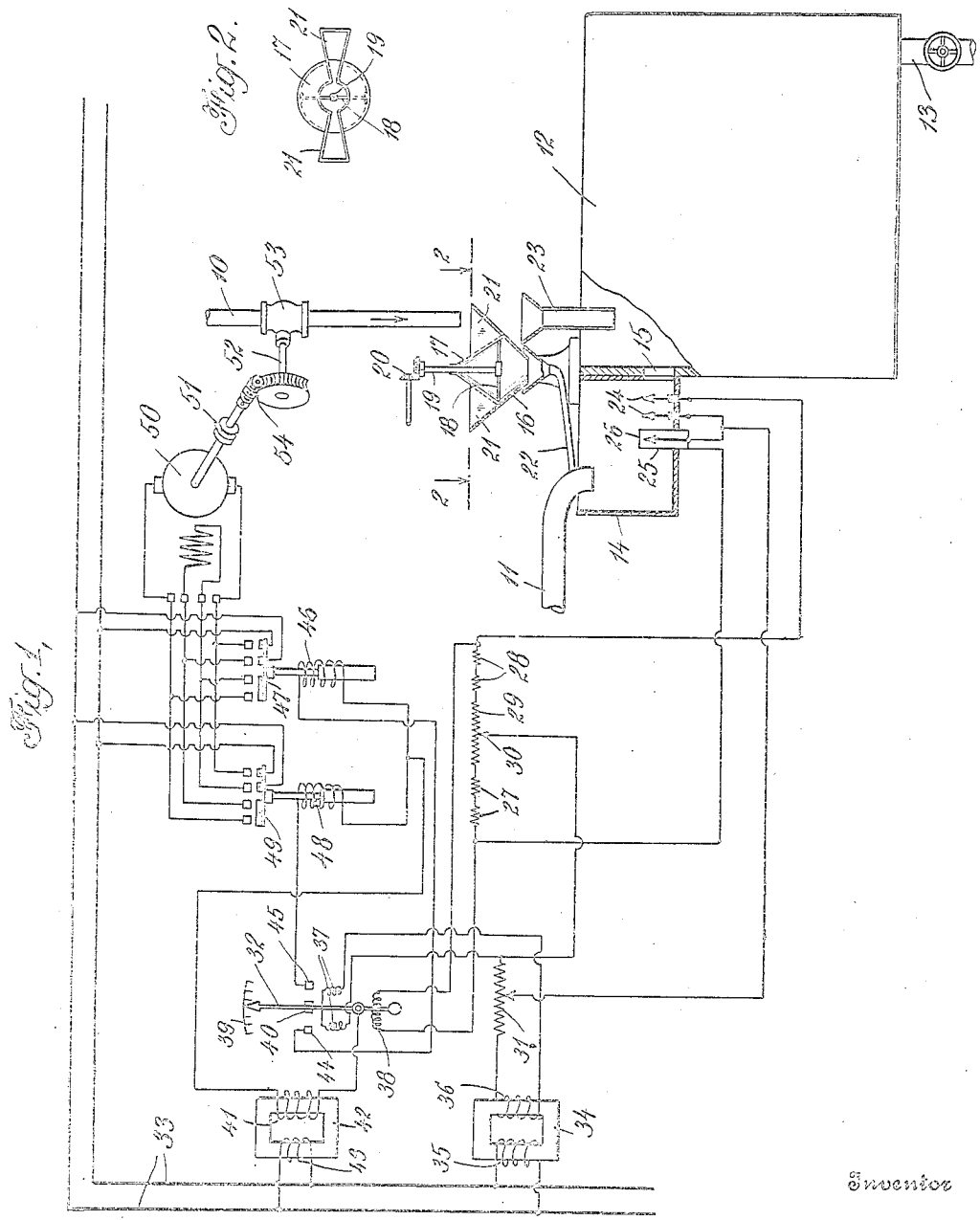

PERRY HADWICK BASCOM, OF BOUNDBROOK, NEW JERSEY, ASSIGNOR TO THE DORR COMPANY, A CORPORATION OF DELAWARE.

AUTOMATIC CONTROL OF REACTIONS.

1,399,181.  Specification of Letters Patent.  Patented Dec. 6, 1921.

Application filed December 26, 1919. Serial No. 347,645.

*To all whom it may concern:*

Be it known that I, PERRY H. BASCOM, a citizen of the United States, residing at Boundbrook, in the county of Somerset, State of New Jersey, have invented certain new and useful Improvements in Automatic Control of Reactions; and I do hereby declare the following to be a full, clear, and exact description of the invention, such as will enable others skilled in the art to which it appertains to make and use the same.

This invention relates to the automatic control of reactions, mixes, and the like. More particularly, the invention relates to the control of one or more reacting agents so as to obtain substantially constant or uniform effects as a consequence of the action of the controlled agent or agents. Thus, for example, the invention is especially applicable to the manufacture of sulfuric acid of a predetermined strength in which a relatively concentrated acid is mixed with a relatively dilute acid. The invention has for its general objects the provision of certain improvements in methods of and apparatus for controlling reactions, mixes, and the like.

In substantially all chemical and allied industries, a predetermined desired change in the composition or properties of a material, or the formation of a predetermined desired product, is brought about as the consequence of the action of an appropriate reagent upon the material, or of the action of two more reagents upon one another. In such cases, it is desirable to control the uniformity of the reaction or of the end product. Thus, for example, in the production of sulfuric acid of the commercial concentration of 64° Bé., it is customary to dilute a concentrated acid of approximately 66° Bé. with a relatively weak acid until the desired concentration of 64° Bé. is reached. The present invention, as applied to the manufacture of sulfuric acid of a predetermined concentration, contemplates the provision of improved instrumentalities for enabling the control, either automatically or otherwise, of either the concentrated or weak acid, so as to insure the production of a uniform end product of the desired predetermined concentration.

In carrying out the invention, use is preferably made of changes in the electrical conductivity of an appropriate component of the reaction, mix, or the like, or of the end product, with due regard to and compensation for undesired interfering characteristics of the reaction or materials concerned. Thus, in accordance with the invention, changes in the electrical conductivity of an appropriate component of the reaction, mix, or the like, or of the end product, are employed to effect through suitable instrumentalities a predetermined desired control of the treatment process in hand. In certain instances, changes in the electrical conductivity of the appropriate component of the reaction, mix, or the like, or of the end product, cannot be safely relied upon to directly effect the desired control of the treatment process. Such a condition may arise when operating in the vicinity of a hump in the characteristic conductivity curve of the component employed to effect the desired control of the treatment process. For example, the electrical conductivity of sulfuric acid in the neighborhood of 64°–65° Bé. decreases when the concentration is either increased or decreased, and for this reason, it is undesirable to premise the automatic control of the reaction upon changes in the electrical conductivity alone. The present invention relates more especially to treatment processes of this character and involves the provision of an improved method for accurately effecting the control, either automatically or otherwise, of such processes.

In accordance with the present invention, there is created an intermediate component of the treatment process whose electrical conductivity can be definitely and safely relied upon to effect the necessary control in the treatment process for securing the desired uniform result or end product. Thus, for example, in the manufacture of sulfuric acid of the commercial concentration of 64° Bé., a predetermined measured quantity, for example, one-fifth, of the total amount of concentrated acid employed in the treatment process is appropriately mixed with the relatively dilute acid employed in the treatment process, thereby creating the aforementioned intermediate component. Changes in the electrical conductivity of this intermediate component are then employed to effect, through appropriate instrumentalities, the necessary changes in the supply of the concentrated acid to secure a uniform end product having a concentration of 64° Bé. In its preferred form, the treatment process is carried out in a continuous manner and the desired control of the process is automatically effected. If desired changes in the electrical conductivity of the intermediate component may be appropriately indicated to the operator in charge of the process, and he may manually or otherwise effect the necessary changes in the treatment process to secure the desired uniformity. In all cases appropriate compensation is made for any interfering characteristics of the intermediate component, such as, for example, changes in temperature, so as to eliminate the influence of such interfering characteristics.

The novel features of the invention which I believe to be patentable are definitely set forth in the claims appended hereto. These features, together with the arrangement and mode of operation of a control equipment embodying the same, will be better understood from the following description taken in conjunction with the accompanying drawings, in which:

Figure 1, diagrammatically illustrates an automatic reaction control equipment embodying the invention; and Fig. 2 is an explanatory sectional view taken on the section line 2—2 of Fig. 1.

Throughout the following description of the drawings, I shall refer particularly to the manufacture of sulfuric acid of the commercial concentration of 64° Bé. by mixing a relatively concentrated acid with a relatively weak acid, but I wish it to be understood that the invention is not limited to this particular treatment process, and I have merely chosen it as a representative treatment process of the kind to which the invention is especially applicable. It is, moreover, to be understood that the control equipment is more or less diagrammatically represented in the accompanying drawings, and consequently various modifications may be made in the equipment without departing from the spirit of the invention.

Referring now to the drawings, a supply pipe or conduit 10 for the concentrated acid and a supply pipe or conduit 11 for the weak acid are arranged to discharge into a mixing tank or receptacle 12. The tank 12 is provided with an outlet 13 for the discharge of the end product of the treatment process, that is sulfuric acid of a uniform concentration of 64° Bé. In accordance with the present invention, the weak acid supply pipe 11 discharges directly into an auxiliary receptacle 14, which communicates through a port 15 with the tank 12.

A measured quantity of the total concentrated acid supplied to the tank 12 is mixed in the receptacle 14 with the weak acid discharged from the pipe 11, thus creating a mixture which I have herein referred to as the intermediate component whose electrical conductivity is made use of to effect the desired control of the treatment process. I have found that an appropriate intermediate component for the purposes of the invention may be created by mixing one-fifth of the total concentrated acid employed in the treatment process with the incoming weak acid employed. The electrical conductivity curve of this intermediate component is admirably adapted for effecting the desired control of the treatment process.

The measured quantity or sample of the incoming concentrated acid may be obtained in various manners and mixed with the incoming weak acid. Thus, for example, I have found a sampling device of the general construction of the well known Vezin sampler well adapted for the purposes of the invention. This sampling device, as illustrated in the accompanying drawings, comprises two hollow cones 16 and 17 secured together at their bases. These cones are attached to a spider 18, which in turn is secured to a vertical shaft 19. The shaft 19 is rotated at a suitable constant speed from an appropriate source of power (not shown) through the beveled gears 20. The upper cone 17 carries one or more scoops 21, which are open at the top and communicate with the interior of the cones 16—17. A pipe 22 communicates with the weak acid supply pipe 11 and feeds into this pipe the measured amount of concentrated acid delivered to the scoops 21.

The scoops 21 rotate at a suitable constant speed, and during each revolution of the shaft 19 each scoop comes directly beneath the outlet of the concentrated acid supply pipe 10 and receives a predetermined measured quantity of the concentrated acid which is thereupon introduced into the receptacle 14 along with the weak acid. The remainder (for example, four-fifths of the total quantity flowing through the pipe 10) of the concentrated acid supply is received by the funneled inlet pipe 23 and discharged thereby into the tank 12. It will, of course, be understood that the design of the scoops 21 and the speed of rotation of the shaft 19 may be so chosen as to withdraw any appropriate or desired fraction of the total concentrated acid flowing through the supply pipe 10.

The weak acid from the supply pipe 11 and the measured quantity or sample of the concentrated acid are continuously fed into the receptacle 14, thereby creating an intermediate component, the changes in whose electrical conductivity are employed to effect the desired control in the treatment process. In the equipment illustrated in Fig. 1, a pair of testing electrodes 24 insulatively project through the bottom of the receptacle 14, in the vicinity of the outlet port 15, and a temperature compensator 25—26 also projects through the bottom of the receptacle 14 in proximity to the testing electrodes 24. The compensating device consists of an outer metallic casing or electrode 25 and an inner electrode 26. An appropriate electrolyte having substantially the same temperature coefficient of electrical conductivity as the mixture in the receptacle 14 is confined within the electrode casing 25.

The testing electrodes 24 and the compensating device 25—26 are connected, in the equipment represented in Fig. 1, as two arms of a Wheatstone bridge in which the other two arms comprise resistances 27 and 28. The resistances 27 and 28 are preferably composed of a plurality of calibrated units which may be cut in and out, as desired. These two resistance arms of the bridge are connected by an intermediate resistance 29 having an adjustable contact 30 connected to the source of electric energy from which the bridge is energized. The bridge is energized from an adjustable resistance potentiometer 31, and the balanced or unbalanced condition of the bridge is indicated by the moving element or pointer 32 of an appropriate electrical measuring instrument, such, for example, as a galvanometer, an ammeter, a contact-making volt-meter, or the like.

In the equipment represented in the accompanying drawings, the electrical energy required is derived from alternating current supply mains 33. A transformer 34, having its primary winding 35 connected to the mains 33, has a secondary winding 36 to which is connected the potentiometer resistance 31 and the stationary or field coils 37 of the indicating or contact making instrument. The moving element of this instrument carries a coil 38 which is connected across the bridge, as previously explained, for indicating any unbalancing of the arms 24 and 25—26 thereof.

The moving element or pointer 32 may, if desired, sweep across an appropriate scale 39. This scale may, if desired, be appropriately calibrated in terms or units of any desired characteristic concerned with the condition of the end product or any component of the treatment process. Thus, for example, the scale 39 may be calibrated in units of the concentration of the mixed acid withdrawn through the outlet 13 from the tank 12. The moving element or pointer 32 carries an electrical contact 40 which is electrically connected, for example, through the pivot bearing of the instrument and appropriate electrical conductors, to the secondary winding 41 of a transformer 42, whose primary winding 43 is connected to the supply mains 33.

A pair of stationary contacts 44 and 45 are operatively arranged on opposite sides of the movable contact 40. The contact 44 is connected to one terminal of the energizing coil 46 of a solenoid-operated or electro-magnetic switch 47, and the contact 45 is connected to one terminal of the energizing coil 48 of a second solenoid-operated or electro-magnetic switch 49. The other terminals of the energizing coils 46 and 48 are connected together and to the secondary winding 41 of the transformer 42.

The switches 47 and 49 are connected to the terminals of a series electric motor 50. The rotor of this motor is connected through a slip clutch 51 and a worm gear drive 54 to the operating stem 52 of a valve 53, in the concentrated acid supply pipe 10. The armature and field windings of the motor 50 are so connected to the contacts of the switches 47 and 49 that the rotor of the motor revolves in one direction when switch 47 is closed and in the opposite direction when switch 49 is closed.

The operation of the equipment will, it is believed, be clear to those skilled in the art from the foregoing description. As long as the electrical conductivity of the intermediate component in the receptacle 14 remains of a predetermined constant value between the testing electrodes 24, no change in the treatment process takes place. Upon a predetermined decrease or increase in the conductivity of the liquid between the testing electrodes 24, the Wheatstone bridge arrangement becomes unbalanced so that the moving contact 40 engages either the fixed contact 44 or the fixed contact 45 thereby energizing and closing either the switch 47 or 49. The electric motor 50 thereupon operates to open or close the valve 53 so as to effect the necessary change in the treatment process to bring the bridge arrangement again into balance, which is an indication that the end product is of the desired uniformity. In this manner, predetermined changes in the electrical conductivity of the intermediate component of the treatment process contained in the receptacle 14 are employed to effect the necessary changes in the treatment process to secure the desired uniformity. In the case of the production of sulfuric acid of 64° Bé., the intermediate component is obviously of a much lower density or concentration than the end product, and in general, the concentration of this intermediate component will be so chosen that the equipment will operate on an appropriate part of the conductivity curve.

The instrumentalities herein described and illustrated for producing an action responsive to variations in the electrical conductivity of the intermediate component of the treatment process may assume various forms in practice, and I have merely illustrated one form for the purposes of explanation. Furthermore, various expedients may be resorted to for withdrawing a measured quantity of one of the agents or reagents entering into the reaction and obviously this measured quantity may be mixed with or otherwise subjected to the influence of the whole or only a part of the other agent or agents entering into the reaction. Thus, in general, the invention contemplates isolating a predetermined measured fraction of one of the agents entering into the reaction and subjecting this isolated into the influence of the whole or a fraction to the influence of the whole or a part of another of the agents entering into the reaction thereby producing an intermediate component having the desired electrical conductivity curve. It will be noted that the intermediate component is a true component of the treatment process, and is subsequently made use of in whole in the production of the desired product.

I claim:

1. The method of controlling a treatment process in which two or more agents enter to produce a desired product, which comprises isolating a measured fraction of one of said agents from the supply thereof and subjecting this fraction to the influence of the whole or a part of another of said agents to produce an intermediate component of the treatment process, producing an action responsive to changes in the electrical conductivity of said component, and employing said action to effect the necessary change in the treatment process to maintain uniformity of said product.

2. The method of controlling a treatment process in which two or more agents enter to produce a desired product, which comprises isolating a measured fraction of one of said agents from the supply thereof and subjecting this fraction to the influence of the whole or a part of another of said agents to produce an intermediate component of the treatment process, producing an action responsive to changes in the electrical conductivity of said component, compensating said action for changes in the electrical conductivity of said component occasioned by changes in the temperature thereof, and employing said action to effect the necessary change in the treatment process to maintain uniformity of said product.

3. The method of automatically controlling a treatment process in which two or more agents enter to produce a desired product, which comprises isolating a measured fraction of one of said agents from the supply thereof and subjecting this fraction to the influence of the whole or a part of another of said agents to produce an intermediate component of the treatment process, producing an action responsive to changes in the electrical conductivity of said component, and causing said action to automatically effect the necessary change in the treatment process to maintain uniformity of said product.

4. The method of automatically controlling a treatment process in which two or more agents enter to produce a desired product, which comprises isolating a measured fraction of one of said agents from the supply thereof and subjecting this fraction to the influence of the whole or a part of another of said agents to produce an intermediate component of the treatment process, producing an action responsive to changes in the electrical conductivity of said component and compensated for changes in the temperature thereof, and causing said action to automatically effect the necessary change in the treatment process to maintain uniformity of said product.

5. The method of controlling a treatment process in which two or more agents enter to produce a desired product, which comprises isolating a measured fraction of one of said agents from the supply thereof and subjecting this fraction to the influence of the whole or a part of another of said agents to produce an intermediate component of the treatment process, producing an action responsive to changes in the electrical conductivity of said component and compensated for changes in temperature thereof, and causing said action to automatically modify the supply of one of said agents to the process so as to maintain uniformity of said product.

6. The method of controlling the manufacture of sulfuric acid of a predetermined concentration in which a concentrated acid is mixed with a weak acid to produce the desired product, which comprises isolating a measured fraction of the concentrated acid from the supply thereof and subjecting this fraction to the influence of the whole or a part of the weak acid supplied to the process to produce an intermediate component of lower concentration than the desired product, producing an action responsive to changes in the electrical conductivity of said component, and employing said action to effect the necessary change in the supply of one of said acids to the process so as to maintain uniformity of said product.

7. The method of controlling the manufacture of sulfuric acid of a predetermined concentration in which a concentrated acid is mixed with a weak acid to produce the desired product, which comprises isolating a measured fraction of one of said acids from the supply thereof and subjecting this fraction to the influence of the whole or a part of the other acid supplied to the process to produce an intermediate component of a lower concentration than the desired product, producing an action responsive to changes in the electrical conductivity of said component, and employing said action to effect the necessary change in the supply of one of said acids to the process so as to maintain uniformity of said product.

8. The method of controlling a treatment process in which two or more agents enter to produce a desired product, which comprises continuously isolating a measured fraction of one of said agents from a continuous supply thereof and subjecting this fraction to the influence of the whole or a part of a continuous supply of another of said agents to continuously produce an intermediate component of the treatment process, producing an action responsive to changes in the electrical conductivity of said component, and employing said action to effect the necessary change in the treatment process to maintain uniformity of said product.

9. The method of controlling the manufacture of sulfuric acid of a predetermined concentration in which a continuous supply of a concentrated acid and a continuous supply of a weak acid are mixed to produce the desired product, which comprises continuously isolating a measured fraction of the concentrated acid from the continuous supply thereof and subjecting this fraction to the influence of the whole or a part of the continuous supply of the weak acid and thereby producing an intermediate component of lower concentration than the desired product, producing an action responsive to changes in the electrical conductivity of said component, and causing said action to automatically modify the supply of said concentrated acid to the process so as to maintain uniformity of said product.

10. An apparatus for controlling a treatment process in which two or more agents are continuously supplied to produce a desired product, which comprises means for continuously isolating a measured fraction of one of said agents from the supply thereof, means for subjecting this measured fraction to the influence of the whole or a part of the continuous supply of another of said agents and thereby producing an intermediate component of the treatment process, means for producing an action responsive to changes in the electrical conductivity of said component, and means for causing said action to automatically effect the necessary change in the treatment process to maintain uniformity of said product.

11. A control apparatus for the manufacture of sulfuric acid of a predetermined concentration in which a concentrated acid is mixed with a weak acid, which comprises a receptacle, means for supplying concentrated acid to the receptacle, means for supplying weak acid, means for withdrawing from said concentrated acid supply a measured fraction of the concentrated acid the remaining portion of the concentrated acid supply being delivered to said receptacle without being withdrawn by the measuring means, means for producing a mixture of this measured fraction with the whole or a part of the weak acid supply, means for producing an action responsive to variations in the electrical conductivity of said mixture, and means for causing said action to effect predetermined modifications in the supply of one of said acids whereby uniformity of said product is maintained.

12. A control apparatus for the manufacture of sulfuric acid of a predetermined concentration in which a concentrated acid is mixed with a weak acid, which comprises a receptacle, means for continuously supplying concentrated acid to the receptacle, means for continuously supplying weak acid, means for continuously withdrawing from said concentrated acid supply a measured fraction thereof the remaining portion of the concentrated acid supply being delivered to said receptacle without being withdrawn by the measuring means, means for producing a mixture of this fraction with the whole or a part of the weak acid supply, means for producing an action responsive to variations in the electrical conductivity of said mixture and compensated for changes in temperature thereof, and means for automatically causing said action to effect predetermined modifications in the supply of said concentrated acid whereby uniformity of said product is maintained.

In testimony whereof I affix my signature.

PERRY HADWICK BASCOM.